United States Patent
Tien et al.

(10) Patent No.: US 9,269,135 B2
(45) Date of Patent: Feb. 23, 2016

(54) DEFECT MANAGEMENT SYSTEMS AND METHODS

(75) Inventors: Yan-Wei Tien, Hualien (TW); Pei-Yi Su, Taichung (TW); You-Hong Huang, Guishan Township (TW); Ching-Cheng Wang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1025 days.

(21) Appl. No.: 13/410,190

(22) Filed: Mar. 1, 2012

(65) Prior Publication Data

US 2013/0231769 A1   Sep. 5, 2013

(51) Int. Cl.
*G06F 19/00*  (2011.01)
*G06K 9/00*  (2006.01)
*G06T 7/00*  (2006.01)

(52) U.S. Cl.
CPC ....... *G06T 7/001* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 6,434,264 B1* | 8/2002 | Asar | 382/147 |
| 2004/0120569 A1* | 6/2004 | Hung et al. | 382/144 |
| 2005/0004774 A1* | 1/2005 | Volk et al. | 702/108 |
| 2009/0208090 A1* | 8/2009 | Nishiura et al. | 382/149 |
| 2011/0296362 A1* | 12/2011 | Ishikawa et al. | 716/112 |
| 2012/0093392 A1* | 4/2012 | Takagi et al. | 382/149 |
| 2013/0174102 A1* | 7/2013 | Leu | 716/52 |

* cited by examiner

*Primary Examiner* — Ryan Jarrett
(74) *Attorney, Agent, or Firm* — Slater & Matsil, L.L.P.

(57) ABSTRACT

Defect management systems and methods are disclosed. A system for managing defects on an object includes an automatic defect classification (ADC) module, a lithographic plane review (LPR) module, and a defect progression monitor (DPM) module in communication with the ADC module and the LPR module. The DPM module is adapted to obtain information regarding a defect disposed on the object from the ADC module and the LPR module and determine if a repair or cleaning is needed of the object.

20 Claims, 6 Drawing Sheets

DEFECT MANAGEMENT SYSTEMS AND METHODS

BACKGROUND

Semiconductor devices are used in a variety of electronic applications, such as personal computers, cell phones, digital cameras, and other electronic equipment, as examples. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Lithography processes involve transferring a pattern from a lithography mask or reticle to a material layer on a semiconductor device. In some lithography methods, a layer of photoresist is applied over the material layer to be patterned, and the layer of photoresist is exposed to energy, such as light, through or reflected from the lithography mask. The layer of photoresist is then developed and used as a mask to etch away portions of the material layer.

If defects reside on the lithography mask, the defects can be transferred to the material layer on the semiconductor device, resulting in undesired patterns in the material layer. The undesired patterns on the semiconductor device can result in poor device performance, shorts or opens, and decreased device yields, depending on the type, location, and severity of the defect.

Defect detection on lithography masks is performed manually and thus there is a risk of human error, resulting in some defects being overlooked or being incorrectly detected. Furthermore, manual defect detection is time-consuming.

What are needed in the art are improved methods of detecting and managing defects of lithography masks and semiconductor devices.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the embodiments of the present disclosure are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Embodiments of the present disclosure are related to the inspection of lithography masks and semiconductor devices. Novel defect management methods for lithography masks and semiconductor devices will be described herein.

Figure 1:
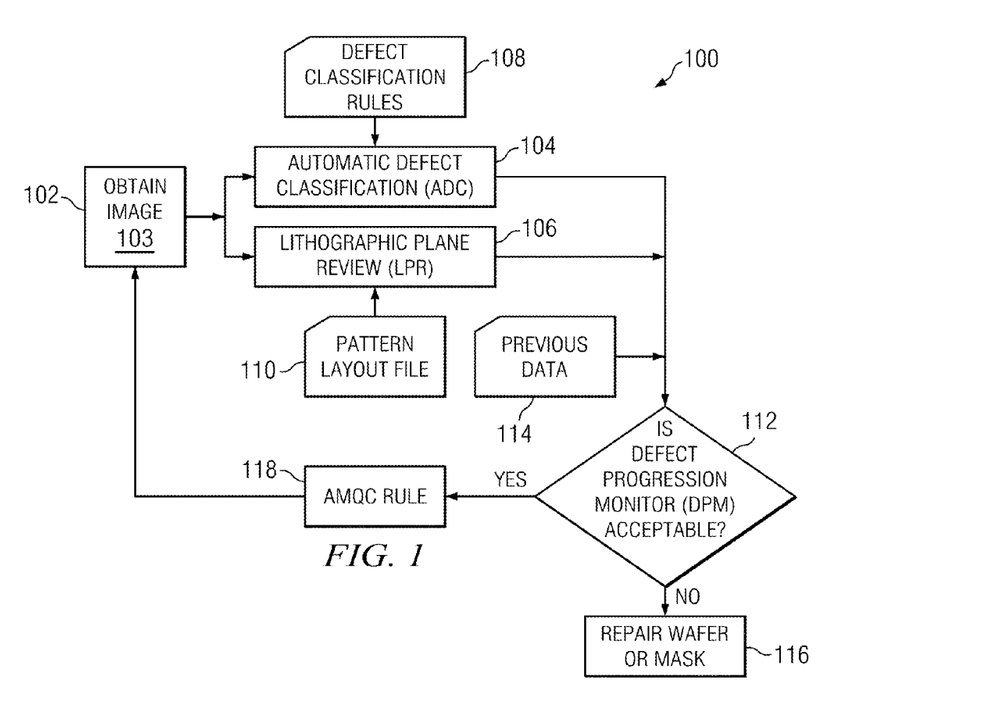
FIG. 1 is a flow chart showing a method of defect management in accordance with an embodiment of the present disclosure.

Referring first to FIG. 1, there is shown a flow chart 100 of a novel method of defect management in accordance with an embodiment of the present disclosure. First, in step 102, an image of a lithography mask or wafer (not shown in FIG. 1; see lithography reticle or mask 183 and semiconductor device or wafer 184 in FIG. 10) is obtained. The image 103 is obtained by capturing an image of a top surface of the mask 183 or wafer 184 using an inspection tool adapted to capture high resolution images. The image 103 comprises raw data regarding the mask 183 or wafer 184 under inspection. The inspection tool may comprise a tool supplied by Lasertec or KLA-Tencor, as examples, although alternatively, tools manufactured by other suppliers may also be used. The image 103 comprises a high resolution optical image 103 of the surface of the object under inspection.

The image 103 is analyzed using an ADC method (step 104) which utilizes predetermined defect classification rules 108 to classify or categorize defects 136 (not shown in FIG. 1; see defect 136 in FIG. 3C) on the image 103, if defects 136 are found. The ADC method 104 is a portion of the analysis of the image 103 in accordance with embodiments. The ADC method 104 is also referred to herein as an ADC module or ADC algorithm. The image 103 is also analyzed using an LPR method (step 106), which utilizes simulation comparisons and a pattern layout file 110 for the mask 183 or wafer 184 under inspection to determine differences of the image 103 from the original layout. The LPR method 106 is also a portion of the analysis of the image 103 and is also referred to herein as an LPR module or LPR algorithm. The LPR algorithm 106 may be performed simultaneously with the ADC algorithm 104, or before or after the ADC algorithm 104, for example.

The results from the ADC algorithm 104 and the LPR algorithm 106 are input along with previous data 114 to a DPM method (step 112). The DPM method 112 is also a portion of the analysis of the image 103 in accordance with embodiments and is also referred to herein as a DPM module or DPM algorithm. The DPM algorithm 112 compares the test results from the inspection to the previous data 114 to determine if defects 136 on the image 103 are becoming worse or if there are any changes in the defects 136, e.g., over time. If the results of the DPM algorithm 112 are acceptable, then an automatic mask (or wafer) quality control (AMQC) rule is notated as such, and monitoring of the mask 183 or wafer 184 is then continued on a periodic basis, e.g., once a wafer lot or once a day, week, or month, as examples. Alternatively, the inspections may be made on other intervals based on production and/or time. If the results of the DPM algorithm 112 are unacceptable, then the mask 183 or wafer 184 is repaired (step 116).

The novel defect management system and method shown in the flow chart 100 of FIG. 1 is advantageously automatic. After the image 103 is taken using the inspection tool, the method illustrated in the flow chart 100 of FIG. 1 is implemented in an algorithm of a computer system 190 (not shown in FIG. 1; see FIG. 11), to be described further herein, so that human error is avoided and the time taken to analyze the inspection results is decreased. Thus, the monitoring of defects may be performed on a more frequent basis, using the novel methods of the present disclosure.

Figure 2:
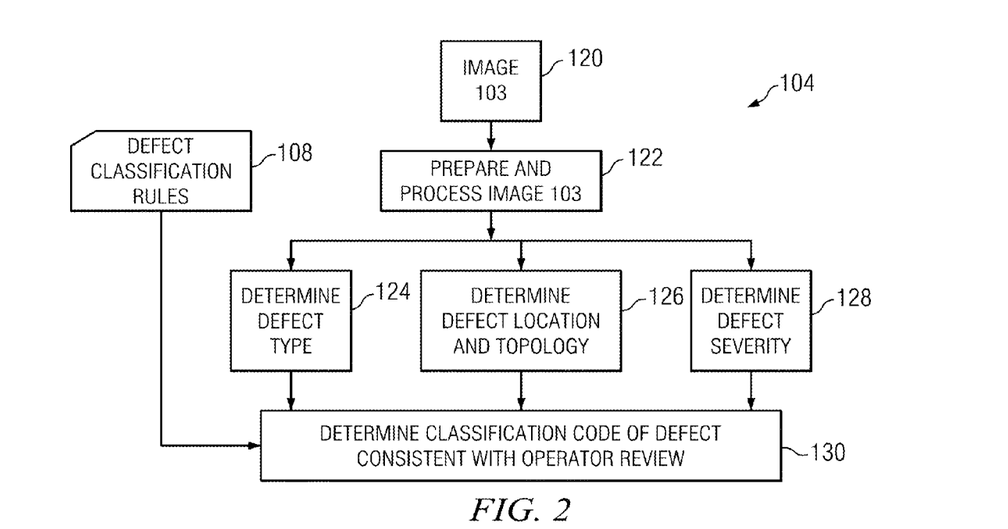
FIG. 2 is a flow chart of an automatic defect classification (ADC) method of the flow chart shown in FIG. 1 in accordance with an embodiment.

FIG. 2 is a flow chart for an ADC algorithm 104 of the flow chart 100 shown in FIG. 1 in accordance with an embodiment. Raw defect transmittance and reflective data (e.g., of the image 103) is checked using the ADC algorithm 104. The ADC algorithm 104 is adapted to classify defects 136 found on the image 103 of the mask 183 or wafer 184, based on an analysis of the image 103. The ADC algorithm 104 may also function as a classification and nuisance/false defect filter based on inspection of the high resolution image 103 in some embodiments, for example.

Upon initializing the novel defect management system and method described herein, defect classification rules 108 are entered as data to the ADC algorithm 104. The defect classification rules 108 are established based on transmittance and reflective difference image 103 and defect 136 position in a pattern region, a dummy region, and/or a blank area on the mask 183 or wafer 184, as examples. Defects 136 may not be a problem if they are located in a dummy region or blank area, for example. The defects 136 may be classified using a defect table and labeled using a classification code, such as "1A, 1B, 1C, 2A, 2B, 2C, 3A, 3B, 3C, 4A, 4B, 4C, 4D," etc. according to category, severity, and other parameters. Other types of classification codes may alternatively be use.

After the image 103 is obtained using step 102 of FIG. 1, the image 103 is input into the ADC algorithm 104 (step 120). The image 103 is prepared and processed by the ADC module 104 (step 122). The position of the defect 136 may be determined by coordinates in a grid based on distances away from edges of the image 103 and then categorized further regarding type, location/topology, and severity in some embodiments, for example.

The results of step 122 are analyzed to determine the defect 136 type (step 124). Examples of types of defects 136 are listed in Table 1:

TABLE 1

False
Contamination on dark
Contamination on clear
Pin-dot
MoSi or chrome extension
Pin-hole
Clear intrusion
Chrome-on-MoSi
Camera blemish/white-spot Other tables may also be used to determine the defect 136 type and analyze the image 103. The ADC algorithm 104 also analyzes the results of step 122 to determine the defect 136 location and topology (step 126). A determination may be made whether the defect 136 resides in an isolated or nested region, or a semi-nested region, for example. A determination may be made whether the defect 136 falls within a specific dimension or range of dimensions may be selected for the defect 136, such as a line width of <0.3 µm, 0.3 to 1.0 µm, or >1.0 µm, as another example, although alternatively, other ranges and dimensions may also be used. A determination may also be made regarding where the defect 136 lies within a certain pattern shape, such as at a corner, at a line or space, at an end-to-end, at a jog or straight area of a bended line, or at a serif or other element of an optical proximity correction (OPC) feature, as examples.

A determination is also made as to the defect 136 severity (step 128) in the ADC algorithm 104. Issues such as transmittance/reflectance residue, transmittance/reflectance size, transmissive percentage of critical dimension error (% CDE), and transmissive energy flux difference may be considered to determine the defect 136 severity, as examples. A pass/fail decision may then be made regarding the defect 136 based on the severity determination.

The results of steps 124, 126, and 128, and also the defect classification rules 108 are used to determine a classification code of the defect 136 that is consistent with an operator review (step 130), e.g., if an operator were to visually inspect the mask 183 or wafer 184 rather than use the novel defect management systems and methods of the present disclosure.

Figure 3A:
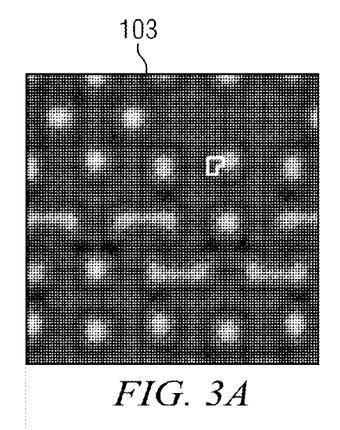
FIGS. 3A, 3B, 3C, 4A, 4B, and 4C illustrate an example of an implementation of the ADC method shown in FIG. 2.
Figure 3B:
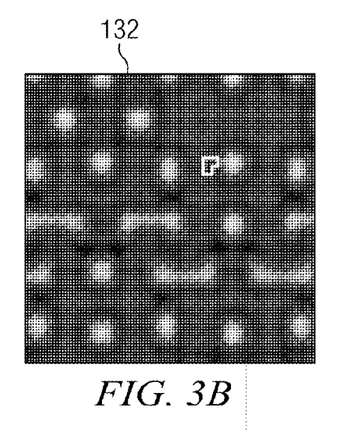
Figure 3C:
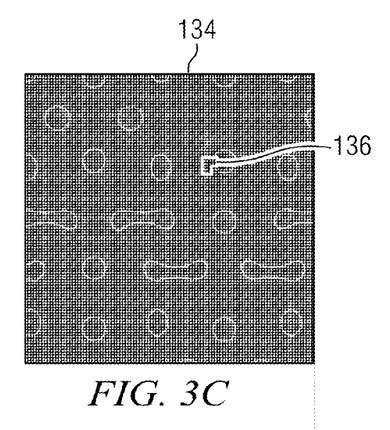
Figure 4A:
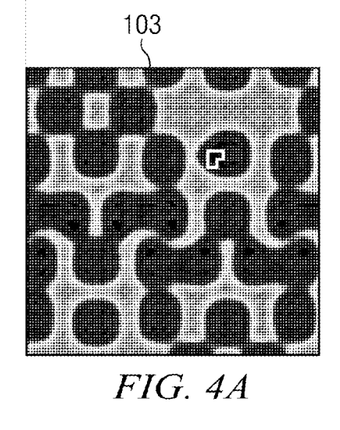
Figure 4B:
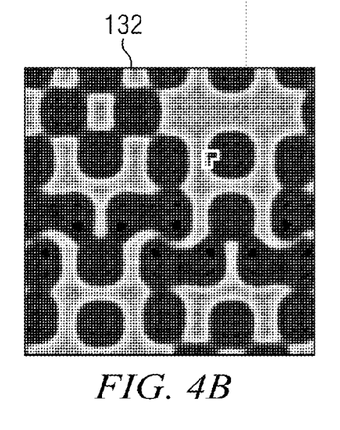
Figure 4C:
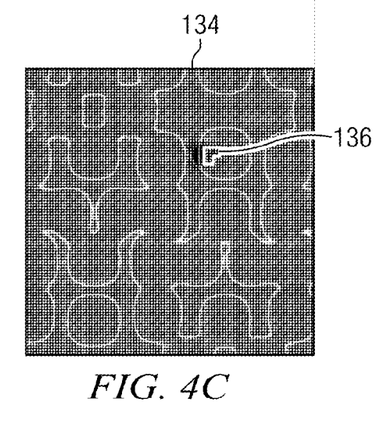

FIGS. 3A, 3B, 3C, 4A, 4B, and 4C illustrate an example of an implementation of the ADC algorithm 104 shown in FIG. 2. The image 103 captured by the inspection tool may comprise a transmitted image 103, as shown in FIG. 3A, or a reflected image 103, as shown in FIG. 4A. In some embodiments, both the transmitted image 103 shown in FIG. 3A and the reflected image 103 shown in FIG. 4A are analyzed, for example. The test images 103 in FIGS. 3A and 4A are compared to a reference transmitted image 132 shown in FIG. 3B and a reference reflected image 132 shown in FIG. 4B, respectively. The difference between the test images 103 and the references images 132 is determined, as shown in FIG. 3C and FIG. 4C, which show a difference in the transmitted and reflected images between the test and reference images 103 and 132, respectively. Defect 136 is an example of a defect that may be found as a result of the analysis. The defect 136 comprises a pin-dot defect in this example.

The patterns of the images 103, 132, and 134 shown in FIGS. 3A, 3B, 3C, 4A, 4B, and 4C are merely examples; many other types of patterns may be formed on a lithography mask 183 and/or semiconductor device 184. The patterns illustrated in the images 103, 132, and 134 may comprise vias, contacts, transistor gates, and/or etch runs, as examples, although alternatively, other patterns may be used, depending on the circuit design of a semiconductor device 184.

Figure 5:
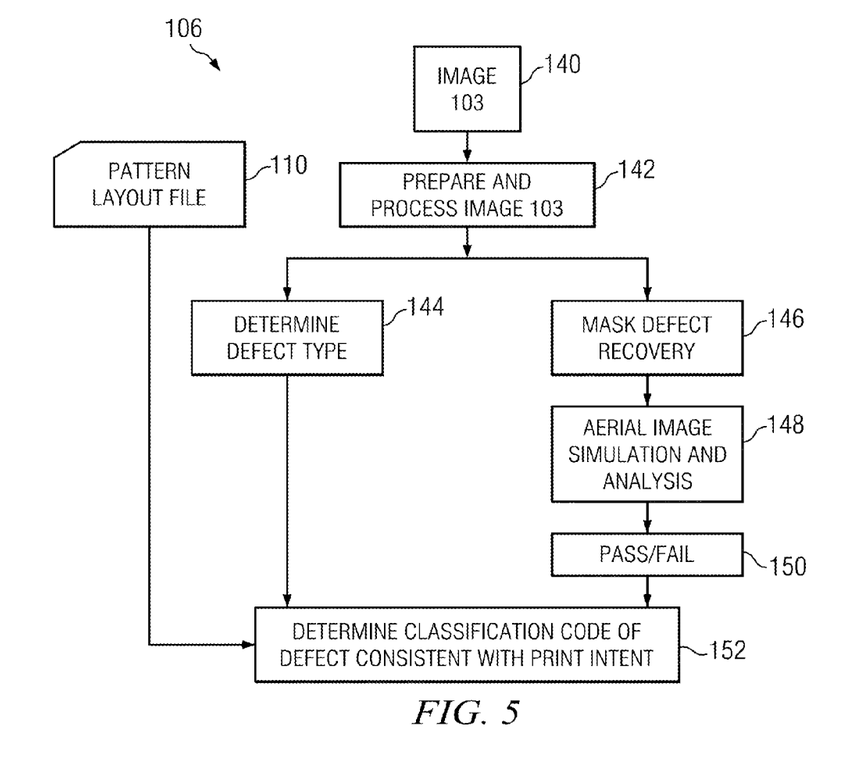
FIG. 5 is a flow chart of a lithographic plane review (LPR) method of the flow chart shown in FIG. 1 in accordance with an embodiment.

FIG. 5 is a flow chart of an LPR algorithm 106 of the flow chart 100 shown in FIG. 1 in accordance with an embodiment. The LPR algorithm 106 is adapted to create a defect simulation image or print of the mask 183 or wafer 184 and perform an overlay comparison with an image file of the mask 183 or wafer 184 pattern layout comprising a pattern layout file 110 (see FIG. 1). The pattern layout file 110 comprises a data file that is used to produce a lithography mask 183, for example. The pattern layout file 110 may comprise a graphic data system (GDSII) or open artwork system interchange standard (OASIS) type of file format, as examples, although other file formats may also be used. The LPR algorithm 106 compares the simulation image of the image 103 with the pattern layout file 110 by performing an overlay comparison to determine the differences in the simulation image and the pattern layout file 110.

After the image 103 is obtained using step 102 of FIG. 1, the image 103 is input into the LPR algorithm 106 (step 140). The image 103 is prepared and processed by the LPR algorithm 106 (step 142). The results of step 142 are analyzed to determine the defect 136 type (step 144) and determine the mask 183 (or wafer 184) defect 136 recovery (step 146). An aerial image simulation and an analysis are then performed (step 148) of the mask 183 (or wafer 184) defect 136 recovery determined, and a pass/fail decision is determined of the defect 136 (step 150). The results of steps 150 and 144, and also the pattern layout file 110 are used to determine a classification code of the defect 136 that is consistent with the print intent (step 152), e.g., for the mask 183 or wafer 184.

Figure 6A:
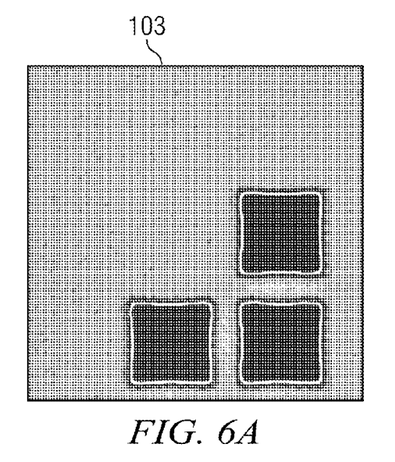
FIGS. 6A, 6B, 6C, and 6D illustrate an example of an implementation of the LPR method shown in FIG. 5.
Figure 6B:
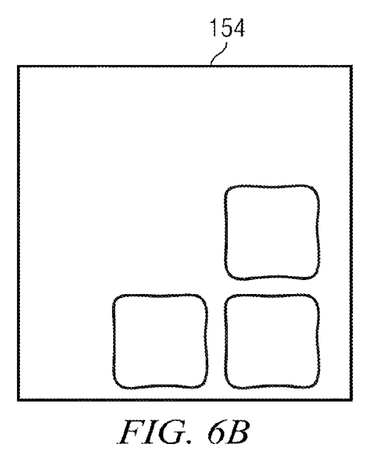
Figure 6C:
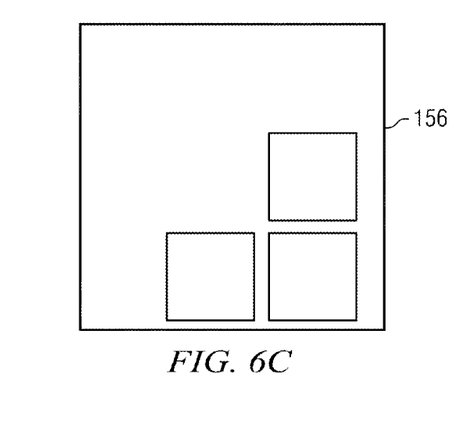
Figure 6D:
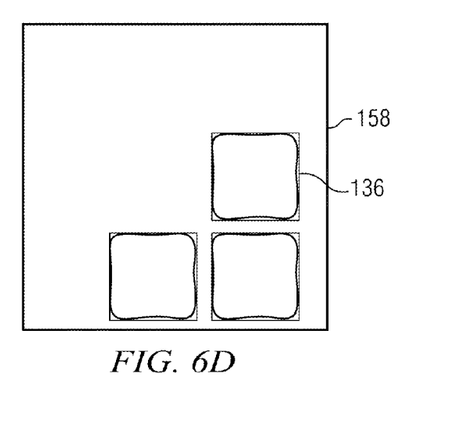

FIGS. 6A, 6B, 6C, and 6D illustrate an example of an implementation of the LPR algorithm 106 shown in FIG. 5. The image 103 captured by the inspection tool may comprise an image 103 shown in FIG. 6A. A simulation image 154 of the edges of the image 103 is produced or created by the LPR algorithm 106 of the image 103, as shown in FIG. 6B. The simulation image 154 comprises an aerial image in some embodiments, for example. Alternatively, the simulation image 154 may comprise a planar image. FIG. 6C shows an image 156 from an image file (e.g., of a GDSII or OASIS file) of a pattern layout file 110. The simulation image 154 is overlaid with the image 156 of a pattern layout file 110, as shown in FIG. 6D at 158. The difference between the simulation image 154 and the image 156 of a pattern layout file 110 is determined from the overlay image 158. The differences are indicative of a defect 136 that may be found as a result of the analysis.

Figure 7:
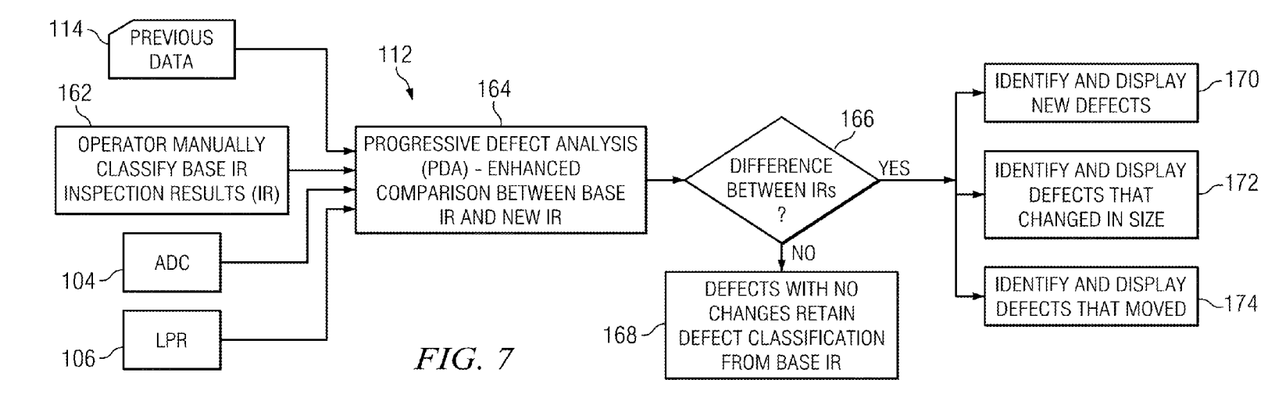
FIG. 7 is a flow chart of a defect progression monitor (DPM) method of the flow chart shown in FIG. 1 in accordance with an embodiment.

FIG. 7 is a flow chart of a defect progression monitor (DPM) algorithm 112 of the flow chart 100 shown in FIG. 1 in accordance with an embodiment. The DPM algorithm 112 comprises a comprehensive analysis of inspection results for defect 136 location and severity. Previous data 114 of defects 136 that has been obtained manually is input to the DPM algorithm 112. Initially before the automatic defect management system and method described herein are implemented, an operator manually classifies a base inspection result (IR), as shown in step 162. After this initial set-up, the ADC 104 algorithm and the LPR 106 algorithm results are also input, and a progressive defect analysis (PDA) is implemented in accordance with embodiments (step 164), which is an enhanced comparison between the base IR and the new IR obtained from the ADC 104 algorithm and the LPR 106 algorithm. Whether there is a difference between the base IR and the new IR is determined (step 166). If there is no difference, defects 136 with no changes retain defect classification from the base IRs (step 168). If there is a difference, then the system identifies and displays any new defects (step 170) found, defects 136 that changed in size (step 172), and defects 136 that moved (step 174) or changed location. The new IR information is then fed back into the system and used for future automatic inspections and monitoring.

Figure 8A:
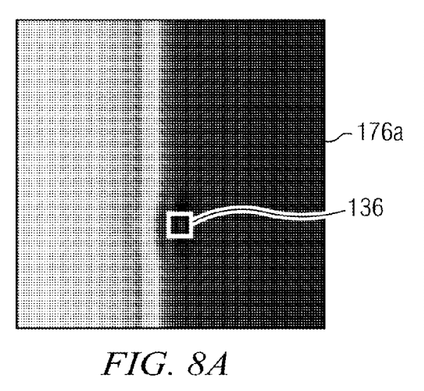
FIGS. 8A, 8B, 9A, and 9B illustrate an example of an implementation of the DPM method shown in FIG. 7.
Figure 8B:
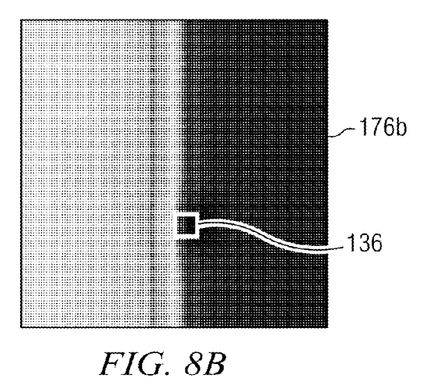
Figure 9A:
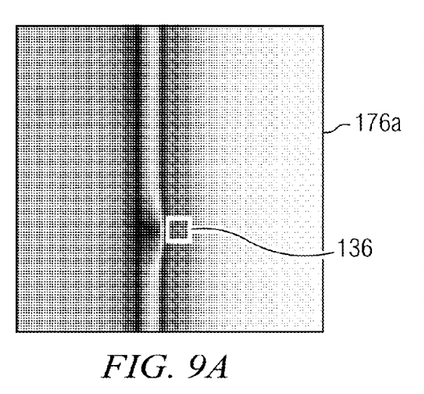
Figure 9B:
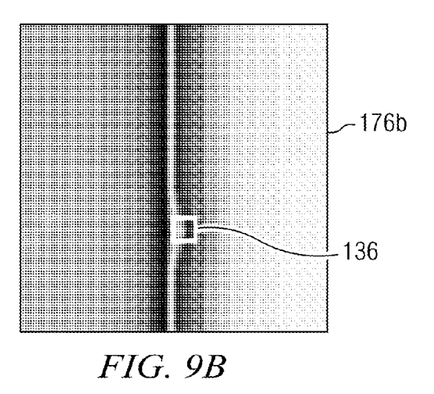

FIGS. 8A, 8B, 9A, and 9B illustrate an example of an implementation of the DPM algorithm 112 shown in FIG. 7. FIGS. 8A and 8B show images 176a and 176b of transmitted data and FIGS. 9A and 9B show images 176a and 176b of reflected data. FIGS. 8A and 9A show images 176a and 176a of new inspection results and FIGS. 8B and 9B show images 176b and 176b of previous (base) inspection results. The defects 136 comprise a pin-hole defect in this example. The new inspection results are compared to the base inspection results, and if there is no significant change or difference, the lithography mask 183 or wafers 184 are continued to be monitored (step 168 of FIG. 7) at periodic, predetermined intervals. However, if there are new, moved, or worse defects 136 detected that are significant, the device under inspection is sent for repair. For example, if a lithography mask 183 is being inspected, the lithography mask 183 is cleaned or repaired to remove or correct the defect 136. If a wafer 184 is under inspection, then the wafer 184 is reworked to remove or correct the defect 136. For example, a wafer 184 may be repaired, if possible, using a laser or other device or method, or a layer of photoresist may be removed from the wafer 184 and replaced with another layer of photoresist and a patterning process may be repeated, after a lithography system or mask 183 is cleaned or otherwise serviced, for example. The wafer 184 may also be cleaned to remove the defect 136 in some circumstances.

Figure 10:
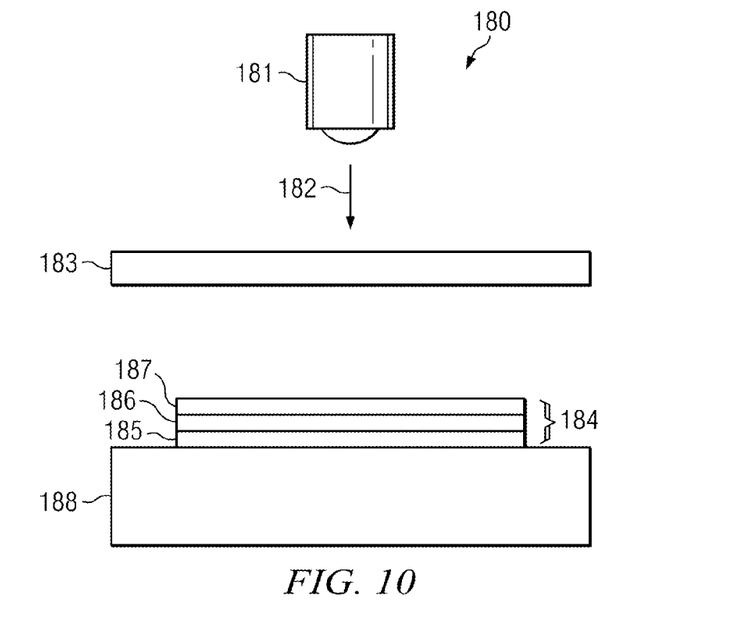
FIG. 10 shows a cross-sectional view of a lithography system that includes a lithography mask that may be used to pattern a material layer on a semiconductor device, illustrating an application of embodiments of the present disclosure.

FIG. 10 shows a cross-sectional view of a lithography system 180 that includes a lithography mask 183 that may be used to pattern a material layer 186 on a semiconductor device or wafer 184, illustrating an application of embodiments of the present disclosure. The lithography system 180 includes an energy source 181 adapted to emit energy 182 or light through the mask 183 towards the semiconductor device 184. The energy 182 may alternatively be reflected from the mask 183, not shown. The semiconductor device 184 includes a workpiece 185 which may include a semiconductor substrate comprising silicon or other semiconductor materials, for example. The workpiece 185 may have a material layer 186 to be patterned deposited thereon. The material layer 186 may comprise an insulating material, a conductive material, a semiconductive material, or combinations or multiple layers thereof. Alternatively, the material layer 186 may not be present, and the workpiece 185 may be patterned. A photosensitive material such as a photoresist 187 may be formed over the material layer 186, as shown. The system 180 includes a support 188 for the semiconductor device 184.

Embodiments of the present disclosure may be used to inspect the lithography mask 183 or the layer of photoresist 187, the material layer 186, or the workpiece 185 after a patterning process or processes using the lithography system 180, as examples. The material layer 186 may be inspected to monitor and classify critical dimension (CD) defects and/or to determine CDE, for examples. Alternatively, other devices and portions of wafer fabrication systems may also be inspected.

Figure 11:
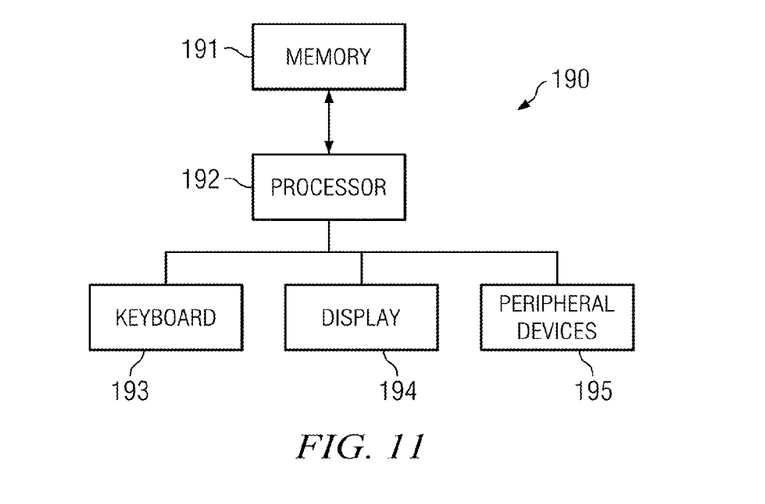
FIG. 11 is a block diagram of a computer system adapted to implement the novel defect management systems and methods to be described herein.

FIG. 11 is a block diagram of a computer system 190 adapted to implement the novel defect management methods described herein. The computer system 190 includes a memory 191, a processor 192, a keyboard 193, a display 194, and other peripheral devices 195. The memory 191 is adapted to store the data and images 103 collected, the classification database for defects 136, the base IR data, and software for the algorithms and methods described herein. The processor 192 is adapted to perform the comparisons of the various images 103 and analysis results. The processor 192 is also adapted to categorize the defects 136 into the defined classifications. The keyboard 193, display 194, and other peripheral devices 195 provide operator interfaces.

Embodiments of the present disclosure include the defect management methods described herein, and also include systems that implement the defect management methods, such as the system 190 shown in FIG. 11. The system 190 implements the algorithms described herein in modules in some embodiments, such as an ADC module 104, an LPR module 106, and a DPM module 112, as examples.

Advantages of embodiments of the present disclosure include providing novel defect management systems and methods that are automatic and do not require manual operator inspections after the initial setup. Eliminating the need for manual inspection avoids missed defects 136 in the inspection process and increases the throughput of the mask 183 or wafer 184 inspection. The systems and methods described herein comprise computational software products and computer systems 190 in some embodiments that may be implemented in existing imaging tools or as a separate system in a wafer fabrication environment. Image processing and simulation functions in the defect management systems and methods provide error-free defect 136 filtering, classification, print analysis, and monitoring in wafer fabrication facilities. The automatic defect filtering software may be set up in mask 183 inspection systems and processes and/or in wafer 184 inspection systems and processes.

The classification database rules can be changed and modified as desired by the user. Existing defect 136 inspection files are utilized, verified, and updated as appropriate by the novel defect management systems and methods. If defects 136 are becoming worse over time, the systems and methods described herein automatically detect it and flag the need to correct the problem, preventing decreases in device yields.

The novel ADC algorithm 104, LPR algorithm 106, and DPM algorithm 112 described herein comprise powerful functions that substantially improve cycle time and quality of mask 183 and wafer 184 defect 136 disposition. Because even small defects 136 on lithography masks 183 can cause large problems in wafer 184 manufacturing, product yields are vastly improved and the prevention or reduction of future yield problems are achieved by embodiments of the present disclosure.

In accordance with one embodiment of the present disclosure, a system for managing defects on an object includes an ADC module, a LPR module, and a DPM module. The DPM module is in communication with the ADC module and the LPR module. The DPM module is adapted to obtain information regarding a defect disposed on the object from the ADC module and the LPR module and determine if a repair or cleaning is needed of the object.

In accordance with another embodiment, a method of managing defects in a semiconductor device manufacturing process is disclosed. An image is obtained of the semiconductor device or a lithography mask used to manufacture the semiconductor device, and an ADC algorithm and an LPR algorithm are performed on the image. A DPM algorithm is also performed, the DPM algorithm being adapted to analyze information received from the ADC algorithm and the LPR algorithm regarding a defect disposed on the semiconductor device or the lithography mask and determine if a repair or a cleaning is needed of the semiconductor device or the lithography mask.

In accordance with yet another embodiment, a method of managing defects in a semiconductor device manufacturing process includes obtaining an image of the semiconductor device or a lithography mask used to manufacture the semiconductor device, and performing an ADC algorithm on the image. The ADC algorithm includes classifying a defect on the image using a predetermined set of classification rules. An LPR algorithm is also performed on the image, the LPR algorithm including analyzing the image using a pattern layout file for the image. A DPM algorithm is performed on results from the ADC algorithm and the LPR algorithm. The DPM algorithm includes using previous data from the lithography mask or semiconductor devices and results from the ADC algorithm and the LPR algorithm to determine if the obtained image is acceptable. If the obtained image is determined to be acceptable, another image is obtained of the semiconductor device or the lithography mask at a later predetermined time. If the image is determined to be unacceptable, the semiconductor device or the lithography mask is cleaned or repaired.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for managing defects on an object, the system comprising:
    a processor; and
    a non-transitory computer readable storage medium storing programming for execution by the processor, the programming including instructions for:
        performing an automatic defect classification (ADC) algorithm;
        performing a lithographic plane review (LPR) algorithm, the LPR algorithm adapted to create a simulation image of an image of the object and perform an overlay comparison of the simulation image with an image file of a pattern layout file; and
        performing a defect progression monitor (DPM) algorithm, the DPM algorithm adapted to obtain information regarding a defect disposed on the object from the ADC algorithm and the LPR algorithm and determine if a repair or cleaning is needed of the object.

2. The system according to claim 1, wherein the ADC algorithm is adapted to classify the defects based on an analysis of an image of the object.

3. The system according to claim 2, wherein the ADC algorithm further functions as a nuisance/false defect filter.

4. The system according to claim 1, wherein the image file of the pattern layout file comprises a graphic data system (GDSII) file format or an open artwork system interchange standard (OASIS) file format.

5. The system according to claim 1, wherein the LPR algorithm is further adapted to determine a defect recovery of the object.

6. The system according to claim 1, wherein the LPR algorithm is further adapted to make a pass/fail decision regarding the object.

7. The system according to claim 1, wherein the object comprises a lithography mask or a semiconductor device.

8. The system according to claim 1, wherein the system further comprises an inspection tool adapted to capture the image of the object.

9. A method of managing defects in a semiconductor device manufacturing process, the method comprising:

obtaining an image of the semiconductor device or a lithography mask used to manufacture the semiconductor device;

performing an automatic defect classification (ADC) algorithm on the image;

performing a lithographic plane review (LPR) algorithm on the image, the LPR algorithm adapted to create a simulation image of the image of the semiconductor device or the lithography mask and perform an overlay comparison of the simulation image with an image file of a pattern layout file; and performing a defect progression monitor (DPM) algorithm, wherein the DPM algorithm is adapted to analyze information received from the ADC algorithm and the LPR algorithm regarding a defect disposed on the semiconductor device or the lithography mask and determine if a repair or a cleaning is needed of the semiconductor device or the lithography mask.

10. The method according to claim 9, wherein performing the ADC algorithm comprises comparing the image to a list or table of defect classification rules.

11. The method according to claim 10, wherein comparing the image to a list or table of defect classification rules comprises comparing the image to a list of defect classification rules comprising: false, contamination on dark, contamination on clear, pin-dot, MoSi or chrome extension, pin-hole, clear intrusion, chrome-on-MoSi, and camera blemish/whitespot.

12. The method according to claim 10, wherein comparing the image to the list or table of defect classification rules comprises labeling the defect using a classification code.

13. The method according to claim 9, wherein the ADC algorithm is adapted to determine a classification code of the defect that is consistent with an operator review of the semiconductor device or the lithography mask.

14. The method according to claim 9, wherein the LPR algorithm is adapted to determine a classification code of the defect that is consistent with a print intent for the semiconductor device or the lithography mask.

15. A method of managing defects in a semiconductor device manufacturing process, the method comprising:

obtaining an image of the semiconductor device or a lithography mask used to manufacture the semiconductor device;

performing an automatic defect classification (ADC) algorithm on the image, the ADC algorithm comprising classifying a defect on the image using a predetermined set of classification rules;

performing a lithographic plane review (LPR) algorithm on the image, the LPR algorithm comprising analyzing the image using a pattern layout file for the image; and performing a defect progression monitor (DPM) algorithm on results from the ADC algorithm and the LPR algorithm, the DPM algorithm comprising using previous data from the lithography mask or semiconductor devices and results from the ADC algorithm and the LPR algorithm to determine if the obtained image is acceptable, wherein if the obtained image is determined to be acceptable, another image is obtained of the semiconductor device or the lithography mask at a later predetermined time, and wherein if the image is determined to be unacceptable, the semiconductor device or the lithography mask is cleaned or repaired.

16. The method according to claim 15, wherein the ADC algorithm comprises:

preparing and processing the obtained image;

if a defect is found on the obtained image, determining a type, location/topology, and severity of the defect; and based on the type, the location/topology, and the severity of the defect determined and the predetermined set of classification rules, determining a classification code of the defect that is consistent with an operator review of the semiconductor device or the lithography mask.

17. The method according to claim 15, wherein the LPR algorithm comprises:

preparing and processing the obtained image;

if a defect is found on the obtained image, determining a type of the defect and a mask defect recovery;

performing an aerial image simulation and an analysis of the mask defect recovery determined;

determining a pass/fail decision based on the aerial image simulation and analysis performed; and based on the defect type determined, the pass/fail decision determined, and the pattern layout file, determining a classification code of the defect that is consistent with a print intent for the image of the semiconductor device or the lithography mask.

18. The method according to claim 15, wherein the DPM algorithm comprises:

performing a progressive defect analysis using the previous data, the results from the ADC algorithm and the LPR algorithm, and base inspection results, the base inspection results having been previously classified manually by an operator; and determining if there is a difference between the base inspection results and the results from the ADC algorithm and the LPR algorithm.

19. The method according to claim 18, wherein if it is determined that there is not a significant difference between the base inspection results and the results from the ADC algorithm and the LPR algorithm, defects with no changes retain defect classification from a base inspection results, or wherein if it is determined that there is a significant difference between the base inspection results and the results from the ADC algorithm and the LPR algorithm, new defects, defects that changed in size, or defects that changed locations are identified and displayed.

20. The method according to claim 15, wherein capturing the image comprises capturing an image of a semiconductor device workpiece, a material layer disposed over the workpiece, or a layer of photoresist disposed over the workpiece.

* * * * *